US011204728B2

(12) United States Patent
Albers et al.

(10) Patent No.: US 11,204,728 B2
(45) Date of Patent: Dec. 21, 2021

(54) PRINT JOB MODIFICATION IN A PRINT SHOP ENVIRONMENT

(71) Applicants: Walter R. Albers, Boulder, CO (US); Linda Sue Liebelt, Boulder, CO (US); Jeffrey Alan Sikkink, Longmont, CO (US); Marquis G. Waller, Beverly, OH (US)

(72) Inventors: Walter R. Albers, Boulder, CO (US); Linda Sue Liebelt, Boulder, CO (US); Jeffrey Alan Sikkink, Longmont, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/801,593

(22) Filed: Feb. 26, 2020

(65) Prior Publication Data

US 2021/0263689 A1    Aug. 26, 2021

(51) Int. Cl.
*G06F 3/12* (2006.01)
*H04N 1/00* (2006.01)

(52) U.S. Cl.
CPC ............ *G06F 3/126* (2013.01); *G06F 3/1245* (2013.01); *G06F 3/1248* (2013.01); *G06F 3/1291* (2013.01)

(58) Field of Classification Search
CPC ...... G06F 3/126; G06F 3/1245; G06F 3/1248; G06F 3/1291
USPC ................................................ 358/1.11–1.18
See application file for complete search history.

(56) References Cited

U.S. PATENT DOCUMENTS

| 8,477,354 | B2 | 7/2013 | Gaertner et al. | |
|---|---|---|---|---|
| 2007/0113164 | A1* | 5/2007 | Hansen | G06Q 10/10 715/209 |
| 2007/0236710 | A1* | 10/2007 | Nishikawa | H04N 1/00413 358/1.6 |
| 2011/0188063 | A1* | 8/2011 | Nuggehalli | G06F 3/1231 358/1.13 |
| 2012/0212757 | A1* | 8/2012 | Gaertner | G06F 3/1247 358/1.13 |
| 2012/0212773 | A1* | 8/2012 | Ciocarlie | G06F 3/1288 358/1.15 |
| 2012/0307262 | A1* | 12/2012 | Fukuda | G06K 15/4065 358/1.2 |

* cited by examiner

*Primary Examiner* — Chad Dickerson
(74) *Attorney, Agent, or Firm* — Duft & Bornsen, PC (57) ABSTRACT

Systems and methods are provided for handling print jobs. One embodiment is a system that includes a print server that serves a print shop having printers which exhibit different capabilities. The print server includes an interface that receives print jobs that each include content in the form of a Job Definition Format (JDF) job ticket and Portable Document Format (PDF) print data, a memory that stores the print jobs, and a controller. The controller schedules the print jobs for printing at the printers, and converts content of at least one of the print jobs to a different implementation, such that print jobs scheduled for printing at different printers include different implementations of content, based on the capabilities of the printer that they are scheduled for printing at.

20 Claims, 6 Drawing Sheets

PRINT JOB MODIFICATION IN A PRINT SHOP ENVIRONMENT

FIELD OF THE INVENTION

The invention relates to the field of printing, and in particular, to handling print jobs scheduled for printing.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

One issue pertaining to rasterization is that different controllers of different printers will interpret Job Description Format (JDF) job tickets for print jobs in a different manner. This is due to different vendors producing different implementations of JDF. When the different implementations of JDF are interpreted by printers of corresponding vendors, the printers generate the same printed output. However, if a printer receives an implementation of JDF that is not produced by a vendor of the printer (or otherwise supported by the controller of the printer), the printer may encounter differences in printed output, or may fail to print the job entirely. Furthermore, it is not uncommon for a single print shop to include cut sheet printers and continuous-forms printers that are from different vendors, exhibit different capabilities, and accept different variations of JDF and/or PDF.

The use of different printers from different vendors at a print shop necessitates a workflow wherein JDF job tickets for print jobs must be tailored to the printers they are intended for printing on. This results in an increased processing burden within the print shop. Similar issues exist pertaining to interpretation of Portable Document Format (PDF) print data that defines the content of logical pages within a print job.

SUMMARY

Embodiments described herein define processing chains which tailor the content of print jobs for printing at different printers. Processing chains are ordered arrangements of programs that modify the content of a print job, such as a job ticket and/or print data for the job. When new print jobs are received and scheduled for printing at a printer, the process of modifying print data for those jobs may be intentionally delayed until immediately prior to printing. Then, a processing chain customizes the job to accommodate the needs of the printer that the job is assigned to, and the job is printed. When processing of the job is delayed until immediately prior to printing, there is no need to reprocess the job if it is rescheduled to a different printer prior to printing. This provides a technical benefit by reducing processing load at a print server that distributes print jobs to printers at the print shop.

One embodiment is a system that includes a print server that serves a print shop having printers which exhibit different capabilities. The print server includes an interface that receives print jobs that each include content in the form of a Job Definition Format (JDF) job ticket and Portable Document Format (PDF) print data, a memory that stores the print jobs, and a controller. The controller schedules the print jobs for printing at the printers, and converts content of at least one of the print jobs to a different implementation, such that print jobs scheduled for printing at different printers include different implementations of content, based on the capabilities of the printer that they are scheduled for printing at.

A further embodiment is a method that includes receiving print jobs that each include content in the form of a Job Definition Format (JDF) job ticket and Portable Document Format (PDF) print data, scheduling the print jobs for printing at printers that exhibit different capabilities, and converting content of at least one of the print jobs to a different implementation, such that print jobs scheduled for printing at different printers include different implementations of content, based on the capabilities of the printer that they are scheduled for printing at.

A still further embodiment is a non-transitory computer readable medium embodying programmed instructions which, when executed by a processor, are operable for performing a method. The method includes receiving print jobs that each include content in the form of a Job Definition Format (JDF) job ticket and Portable Document Format (PDF) print data, scheduling the print jobs for printing at printers that exhibit different capabilities, and converting content of at least one of the print jobs to a different implementation, such that print jobs scheduled for printing at different printers include different implementations of content, based on the capabilities of the printer that they are scheduled for printing at.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
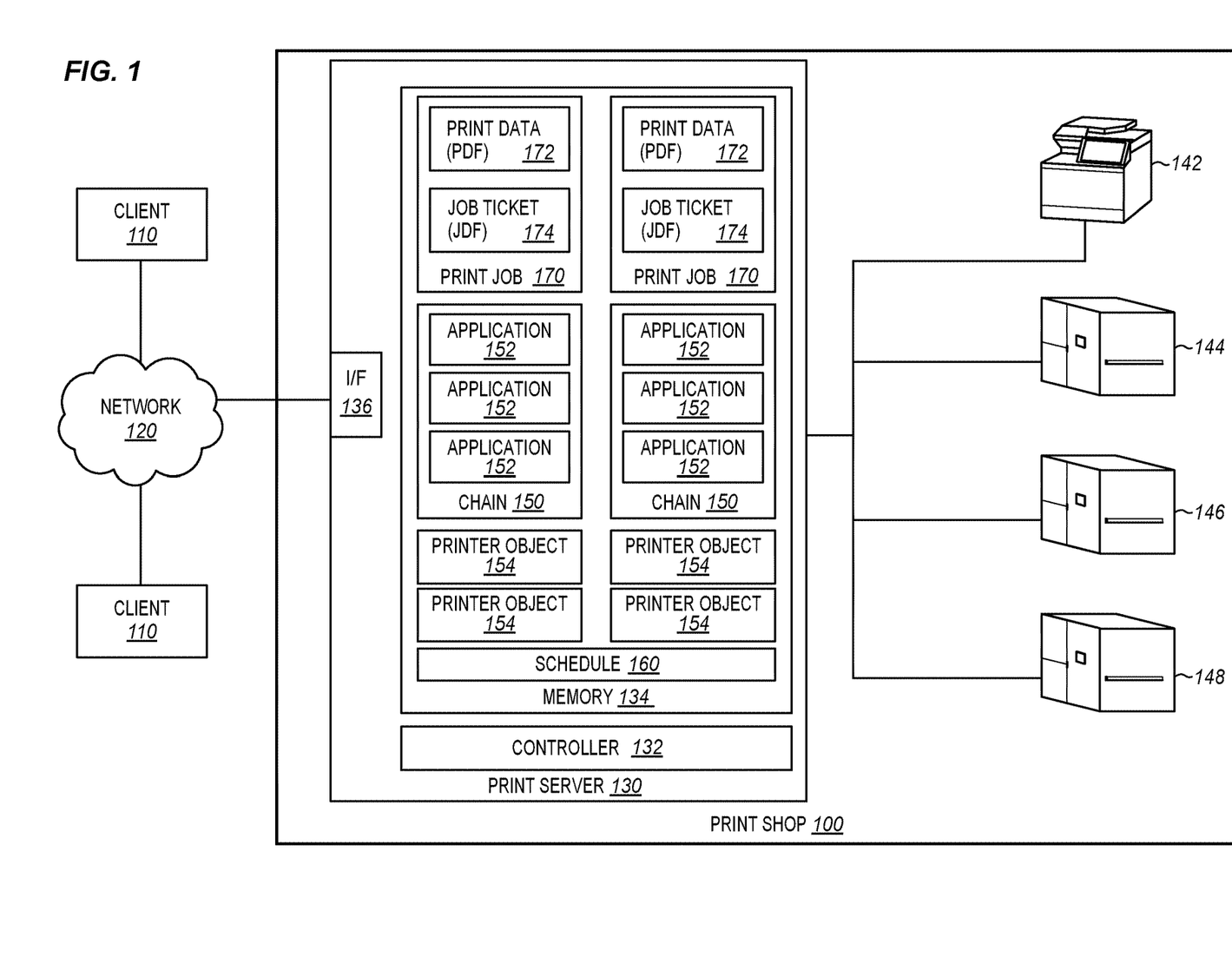
FIG. 1 is a block diagram of a print shop in an illustrative embodiment.

FIG. 1 is a block diagram of a print shop 100 in an illustrative embodiment. Print shop 100 comprises any system, device, or component operable to receive print jobs from one or more clients 110, and to print those jobs via one more printers (e.g., printers 142, 144, 146, and 148). In this embodiment, a print server 130 at the print shop 100 receives jobs from clients 110 via network 120. The clients may comprise any suitable programs for interacting with the print server, such as internet browsers, plugins, custom applications, etc. The network 120 may comprise a local network, a wired or wireless network, the Internet, a cellular network, etc.

The print server 130 schedules the received print jobs for printing at printers 142, 144, 146, and 148. Each printer exhibits different capabilities from one or more of its peers. Different capabilities include differences in interpreting JDF and/or PDF content. Thus, a printer with different capabilities may interpret an implementation of JDF and/or PDF differently than other printers in the print shop, resulting in differences in printed output, or resulting in failure to print a job having an unexpected implementation of JDF and/or PDF. As used herein, a "different implementation" of JDF and/or PDF may refer to differences in formatting, syntax, commands, and/or language within JDF and/or PDF content that reflect customizations of these languages, or departures from standards established for these languages.

In short, the phrase "different capabilities" is used as a shorthand to indicate that a printer interprets job ticket instructions, or print data defining logical pages, in a different manner than other printers at the print shop. This may occur, for example, because the printer is from a different vendor, or is designed to perform a different type of printing operation than other printers, such as monochrome versus color. A printer having different capabilities than other printers may require a different set of instructions than other printers in order to provide the same printed output as other printers. In a further embodiment, different capabilities represent the ability to accommodate different color spaces, print resolutions, print media, finishing instructions (e.g., stapling, binding), and other requirements of print jobs.

Print server 130 has been enhanced to accommodate differences in capability between printers. Specifically, print server 130 is capable of modifying the content of a print job prior to sending the job to a printer in order to provide different implementations of content to different printers, and in one embodiment modifies the content immediately prior to printing. For example, the modification may occur immediately after detecting that the job is second in line at a queue and hence is the next job to be printed, or immediately after detecting that a printer is idle and ready to receive the job. This technique of modifying content immediately prior to printing means that each time a print job is rescheduled from a queue of one printer to a queue of another printer, there is no need to reprocess the print job. This saves computing resources at the print server 130, which in some embodiments manages the scheduling and processing of thousands of print jobs.

In this embodiment, print server 130 includes interface (I/F) 136, which receives and transmits data along network 120. I/F 136 receives print jobs and/or instructions from clients, via a website, email, messaging service, or Application Programming Interface (API). Print jobs acquired from I/F 136 are stored in memory 134. Memory 134 comprises any suitable computer-readable medium capable of storing digital data. For example, memory 134 may comprise a spinning hard disk, flash memory, optical storage media, or some combination thereof. Memory 134 stores print jobs 170, which each include Portable Document Format (PDF) print data 172, as well as a Job Definition Format (JDF) job ticket 174. PDF is an example of a Page Description Language (PDL), and indicates the textual and pictorial content of each logical page in the print job. The job ticket defines how the print data will be processed by the printer, and may include finishing instructions, print media selections, a number of copies to print, etc.

In addition to print jobs 170, memory 134 stores processing chains 150 (also referred to as "chains") for the printers 142, 144, 146, and 148. The chains 150 may each be associated with a different printer object 154, and automatically invoked when the printer object 154 receives a command to print. As used herein, a chain refers to an ordered list/series of applications 152 (also known as "programs," or "filters") to be run upon a print job prior to transmitting the job to a printer. The applications 152 perform operations that preprocess a print job 170 prior to printing. The applications 152 may be custom scripts written by users. The applications 152 each perform operations such as converting between implementations of JDF and/or PDF, adjusting media type (e.g., size and/or weight), rotating pages, adjusting N-up printing parameters, adjusting ink levels, altering binding options, manipulating print data describing logical pages, adding or altering finishing instructions, converting color spaces, etc.

The chains 150 are printer-specific. Thus, each chain 150 is individualized to the capabilities of the printer that it corresponds with, and the unique combination of modifications performed by each chain varies between printers having different capabilities. This means that a chain 150 dedicated to a cut sheet printer may include applications that modify a job ticket to indicate trays for print media, while a chain 150 dedicated to a continuous-forms printer may modify a job ticket to provide different commands for rotating pages than are used for the cut sheet printer.

In one embodiment, each chain 150 is assigned to a printer object 154 stored in memory that represents a corresponding printer at the print shop 100. In a further embodiment, the chain 150 assigned to a printer is vendor-specific or otherwise covers a range of models of printer. After determining the capabilities of the printer that the chain 150 has been assigned to (e.g., by querying a corresponding printer object), the chain 150 analyzes the printer capabilities with a series of logical operators in order to determine which applications 152 to utilize when processing print jobs for the printer. Capabilities or properties of a printer analyzed by the logical operators of the chain can be updated by an operator manually, or picked up automatically via Simple Network Management Protocol (SNMP), Fiery Java Media Framework Application Programming Interface (JMFAPI), or a private Management Information Base (MIB). In a further embodiment, the chain determines current operating conditions of the printer based on interaction with a printer object for the printer. If the current operating conditions (e.g., production rate, ink level, type(s) of media loaded, number and type of output bins installed, error code) are different from a current, normal, or expected operating condition, the chain 150 adjusts the combination of selected applications 152 for the printer to adapt to these changes in condition.

In one embodiment, the act of processing a print job according to a chain 150 comprises assigning the chain to a printer object 154 stored in memory as an initial step, receiving the print job, and then assigning the print job to the printer object 154 at a print step within a workflow generated for the print job. Upon reaching the print step in the workflow, the printer object activates a corresponding chain 150 to process the print job.

After a print job has been processed via a chain, the newly customized version of the print job is transmitted to its assigned printer for printing, while the original version of the print job is retained in memory 134. Thus, if the assigned printer encounters an error during printing, or if another printer is assigned to print additional copies of the print job, the original version of the print job can be processed using its defined processing chain to generate a customized version of the print job for a new printer.

Memory 134 further includes schedule 160. Schedule 160 includes queues for each printer indicating which jobs are scheduled to which printers, as well as the order of printing those jobs at the printers. Print jobs may be moved between queues depending on the status of a printer as well as the printing progress of other jobs. For example, if a printer is jammed or requires maintenance, print jobs in the queue for that printer may be moved to other printers. Alternatively, if a printer is printing through the jobs in its queue faster than expected, print jobs from other queues may be moved to the queue for this printer.

Controller 132 manages the overall operations of the print server 130. For example, controller 132 may manage scheduling, determining preprocessing operations for printers, communicating with printers to determine their capabilities, transmitting print jobs, modifying print jobs and performing other tasks. Controller 132 may be implemented as custom circuitry, as a hardware processor executing programmed instructions, etc. In one embodiment, controller 132 generates a chain for each printer indicating a unique combination of modifications to perform for print jobs prior to printing, based on the capabilities of that printer and in accordance with user input. These chains are stored in memory 134.

Printers 142, 144, 146, and 148 are operable to apply ink onto print media. As used herein, the word "ink" is used to refer to any suitable marking fluid (e.g., aqueous inks, oil-based paints, etc.) that can be applied by a printer onto print media. As used herein, the phrase "print media" (as in print media or printed media) refers to any substrate for receiving a marking fluid. Such substrates include paper, coated paper, card stock, paper board, corrugated fiberboard, film, plastic, synthetics, textile, glass, tile, metal, leather, wood, composites, circuit boards or combinations thereof. The printers 142, 144, 146, and 148 may comprise inkjet or laser printers, and may comprise continuous-forms or cut-sheet printers. In further embodiments, the number, arrangement, and capabilities of the printers varies between print shops.

The particular arrangement, number, and configuration of components described herein is illustrative and non-limiting. Illustrative details of the operation of print shop 100 will be discussed with regard to FIG. 2. Assume, for this embodiment, that print server 130 awaits the input of new print jobs from clients. Furthermore, assume that all printers at the print shop have been initialized, and the controller 132 has generated a chain 150 for each printer indicating an ordered series of processing operations to be performed upon incoming print jobs before the printer initiates printing. Memory 134 stores the chains 150 for the printers.

Figure 2:
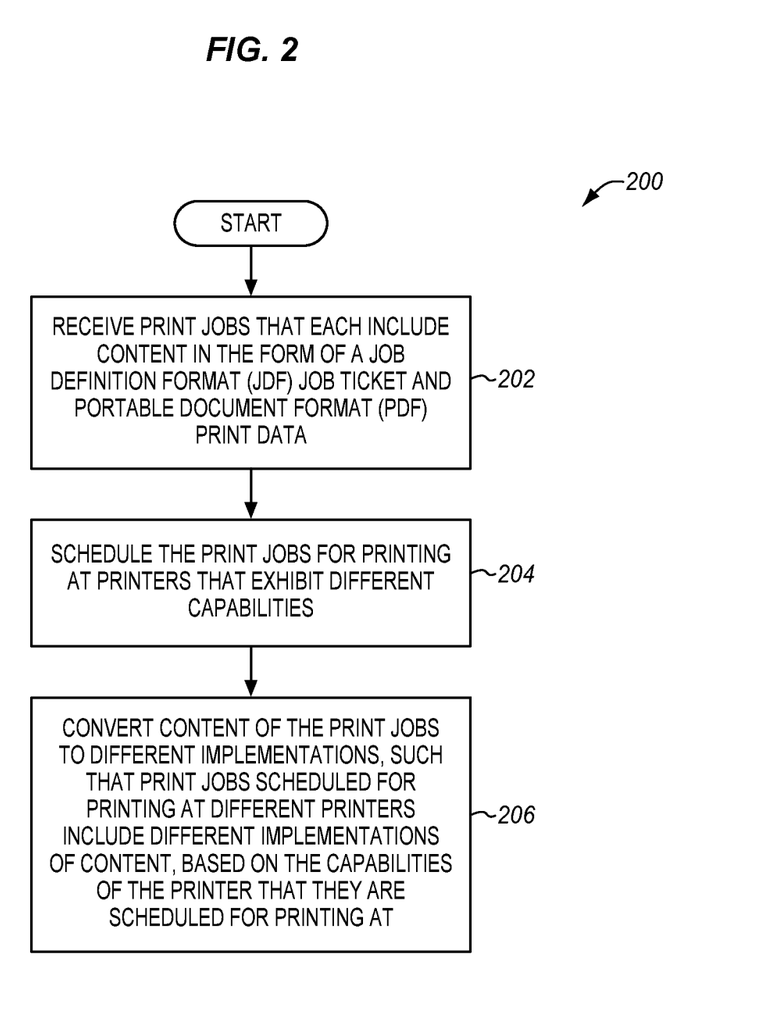
FIG. 2 is a flowchart illustrating a method for operating a print shop to modify print job content prior to printing in an illustrative embodiment.

FIG. 2 is a flowchart illustrating a method 200 for operating a print shop to modify print job content prior to printing in an illustrative embodiment. The steps of method 200 are described with reference to print shop 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, print server 130 receives print jobs 170 via I/F 136. The print jobs 170 each include content in the form of a JDF job ticket 174 and PDF print data 172. In one embodiment, receiving the print jobs 170 comprises receiving an upload from a client 110. The upload includes a PDF file and a series of desired parameters for printing the PDF file. In a further embodiment, receiving the print jobs 170 comprises downloading the print jobs 170 from a website that receives print jobs from the client 110. The received print jobs are stored in memory 134 for later transmission to printers.

In step 204, controller 132 of the print server 130 schedules the print jobs 170 for printing at printers that exhibit different capabilities. In one embodiment, controller 132 schedules the print jobs 170 based on desired delivery dates/times for the print jobs 170. For example, if a print job 170 is compatible with the capabilities of a first printer, but the queue for the first printer indicates a completion date/time that is later than requested by the client 110, then the controller schedules the print job 170 for printing by another printer that has capabilities which are compatible with the print job and that is capable of completing the print job 170 by the desired date/time.

In one embodiment, scheduling comprises assigning a workflow to each of the print jobs. A workflow indicates an ordered arrangement of operations to be performed at the print shop 100 in relation to a print job. These operations can include proofing, printing, finishing, packaging, etc.

In step 206, the controller 132 converts content of at least one of the print jobs such that print jobs scheduled for printing at different printers include different implementations of the content based on the capabilities of the printer that they are scheduled for printing at. Converting may comprise modifying PDF print data, and/or JDF job tickets, for print jobs in order to provide implementations of PDF and/or JDF that are compatible with the capabilities of the printer that a print job is assigned to. In one embodiment, this comprises adjusting the content to an implementation of JDF and/or PDF that is interpretable by the assigned printer (or controller for a printer). Changing the content of a print job to a specific implementation of JDF and/or PDF can be performed by determining an implementation of JDF and/or PDF supported by the printer, then identifying portions of content which are not compatible with the implementation, and altering or replacing the portions of content with content that is compatible with the implementation. This means that the same print job sent to different printers (which support different implementations of PDF and/or JDF), or even to the same printers having different controllers, or different firmware versions for their controllers, may be modified in different ways for each printer, in order to assure a uniform printed output of the print job across those printers.

Detection of incompatible portions/commands can be achieved based on conversion tables that explicitly list such content, or can be achieved dynamically by simulating printing operations. In one embodiment, detection of incompatible portions comprises reviewing metadata for the print job to detect an implementation of JDF and/or PDF used by the print job, and comparing it to implementations supported by the printer (e.g., in Device Capabilities ("DevCaps") indicated by the printer).

In one embodiment, step 206 is performed immediately prior to printing a print job. For example, step 206 may be performed in response to receiving input from a scheduled printer that the printer is ready to immediately start printing the print job, determining that the print job will be printed at the printer after the current job, detecting that the printer is currently idle, etc.

Method 200 provides a technical benefit over prior systems, because it enables print jobs to be printed at a variety of models of printer without the need for substantial manual modification of the content of those print jobs. This saves time and labor at the print shop, and reduces the chance of human error. Furthermore, method 200 prevents print jobs 170 from needing to undergo additional pre-processing if they have been rescheduled. That is, if a print job has been scheduled to a first printer and pre-processed for that first printer, then scheduling the print job to another printer requires another round of pre-processing. By intentionally delaying/withholding preprocessing operations until the last moments before printing, the need for performing an additional round of pre-processing is foregone (i.e., because it is known that the print job will not be rescheduled to another printer at this point).

Figure 3:
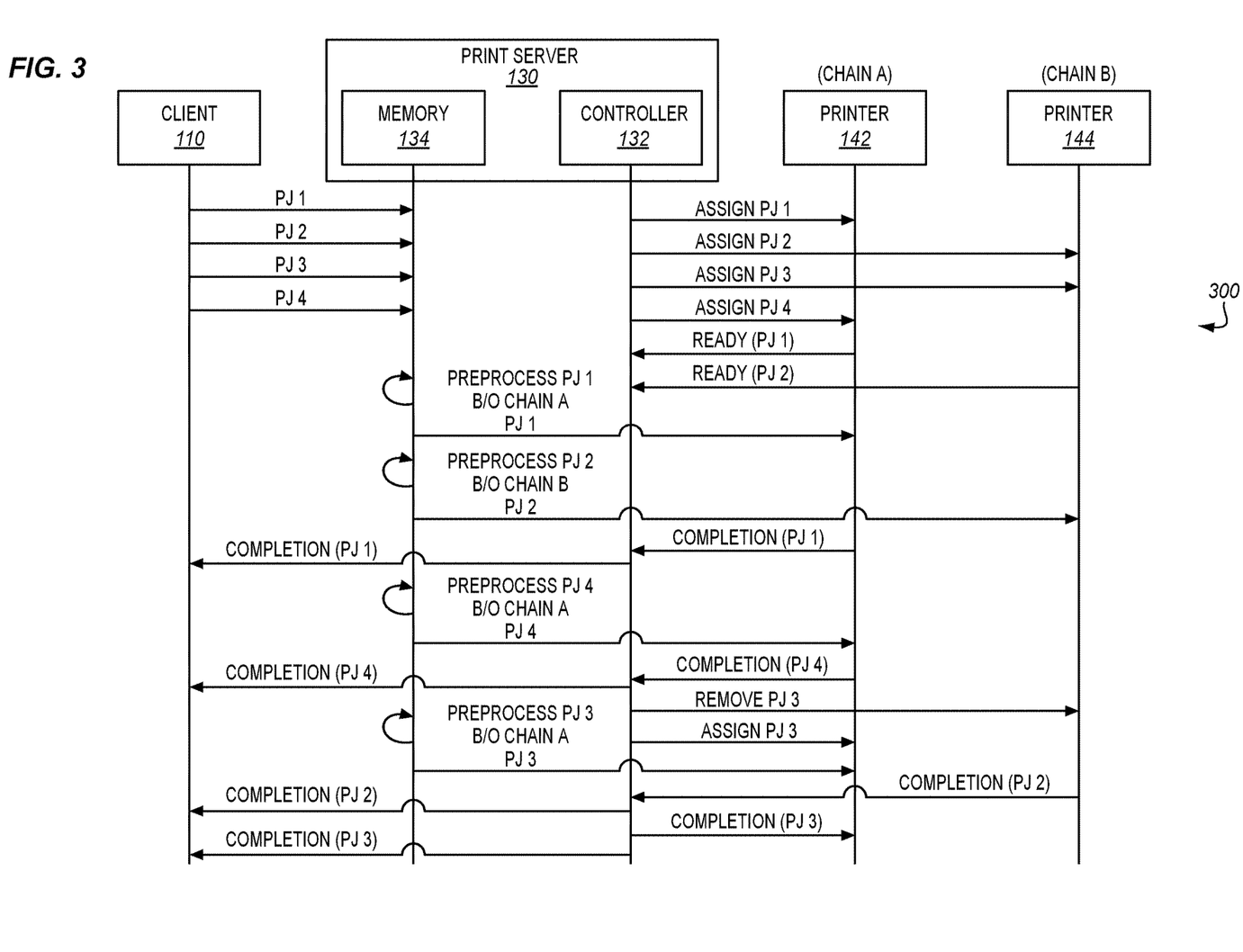
FIG. 3 is a message diagram that depicts communications within a print shop in an illustrative embodiment.

FIG. 3 is a message diagram 300 that depicts communications within a print shop in an illustrative embodiment. Specifically, message diagram 300 depicts an environment where print jobs are dynamically rescheduled based on expected completion times. In this embodiment, a client submits four print jobs to a print server 130, and the print jobs are stored in memory 134. A controller 132 of the print server 130 assigns the print jobs to two separate printers, each associated with a different preprocessing chain. The first and fourth print jobs are assigned to a queue for printer 142 (having chain A), while the second and third print jobs are assigned to a queue for printer 144 (having chain B).

Because both printers are idle, they both report that they are ready to print another print job. Next, the controller 132 preprocesses the first print job according to chain A for printer 142, and sends the print job to the printer 142. Similarly, the controller preprocesses the second print job according to chain B for printer 144, and sends the print job to the printer 144. The printer 142 finishes the first print job, and reports completion to the controller 132. The controller 132 transmits a message to the client indicating that the first print job has been completed. The fourth print job is the next job in the queue for printer 142. Thus, the controller 132 initiates preprocessing of the fourth print job according to chain A for printer 142. The fourth print job is then sent to printer 142.

The printer 142 finishes the fourth job as well, and sends a completion notice to the controller 132. The controller 132 then determines that the third print job, which is currently scheduled for printing at printer 144, would print more quickly if sent to printer 142, because printer 142 is capable of immediately printing the third print job. The controller 132 determines that the printer 142 is capable of printing the third print job, and preprocesses the print job according to chain A.

If the third print job had already been preprocessed using chain B for printer 144 when it was first assigned, then processing resources at print server 130 would have been wasted, because the print job must now be preprocessed according to chain A. However, the third print job has not yet been preprocessed according to a printer-specific chain. The third print job is then sent to the printer 142. The printer 142 then completes the third print job, and the printer 144 completes the second print job. At this point in time, all jobs have been completed and the print server 130 awaits further print jobs for processing.

Figure 4:
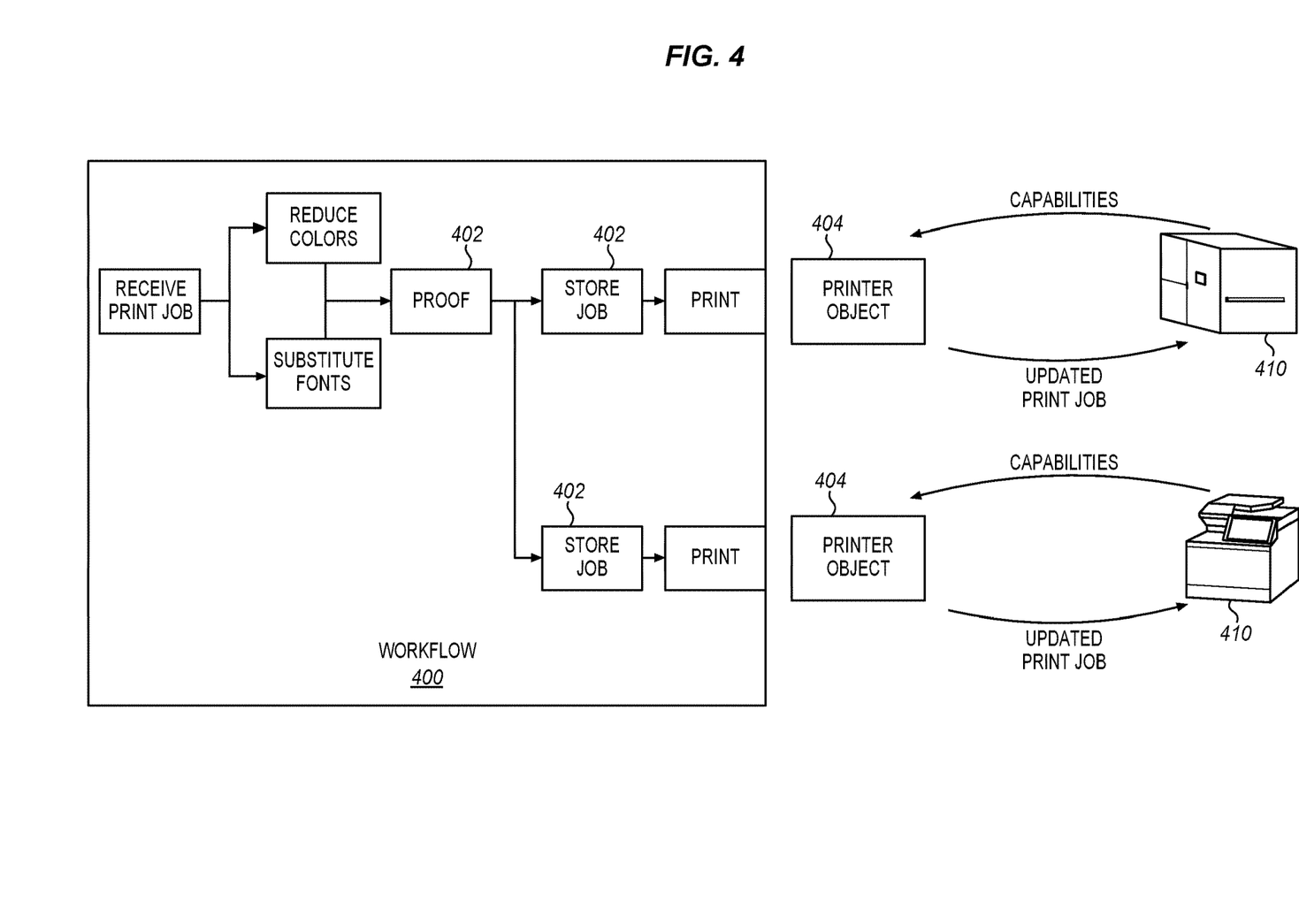
FIG. 4 depicts a workflow for directing handling of a print job in an illustrative embodiment.

FIG. 4 depicts a workflow 400 for directing handling of a print job in an illustrative embodiment. In one embodiment, a technician generates workflow 400 prior to receiving print jobs, and then assigns workflow 400 to print jobs as desired. In this embodiment, the workflow 400 includes a variety of steps 402 such as receiving a print job, reducing a number of colors in the print job, substituting fonts, storing the print job in memory, etc. These steps may be performed sequentially or in parallel as defined by the workflow 400. The workflow 400 includes print steps that are each associated with one or more printer objects 404. Each printer object 404 is associated with a chain 150 (discussed above with regard to FIG. 1), and executes its chain when workflow processing reaches the printer object 404. The chain is based on capabilities of a corresponding printer 410, which may be indicated by the printer object 404, or by the printer itself in response to queries sent from a print server. In one embodiment, the chain for a printer object 404 alters the content of a print job to bring the print job into conformance with the implementation of JDF and/or PDF expected by the printer.

Stated more specifically, the chain for each printer object activates an ordered list of applications 152 in order to modify the print job. However, because a print job may be reassigned or rescheduled prior to printing, processing of the workflow 400 does not advance to the printer object 404 until the printer(s) in the workflow are ready to print the job (e.g., the printer signals that it is idle, or signals that it is within a threshold time of completing a current print job), and the job is the next job in the queue for printing.

Figure 5:
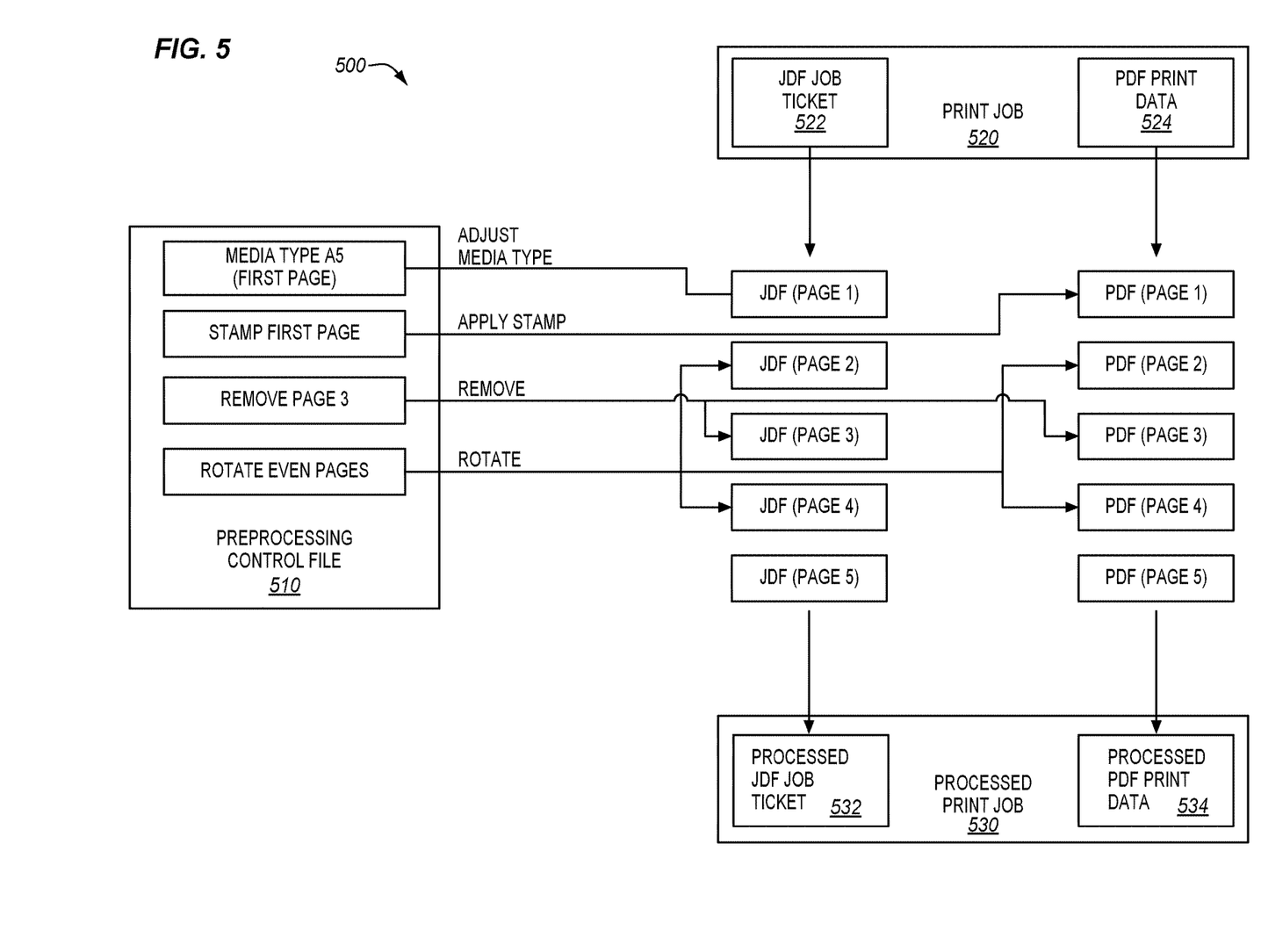
FIG. 5 depicts modifications to print job content in an illustrative embodiment.

FIG. 5 depicts modifications 500 to print job content in an illustrative embodiment. In this embodiment, modifications 500 are performed according to a chain in the form of a preprocessing control file 510. The preprocessing control file 510 activates applications for modifying a JDF job ticket 522 of a print job 520 (e.g., by adjusting a media type, rotating pages, etc.), as well as instructions for modifying PDF print data 524 for a print job 520 (e.g., by removing pages, applying stamps, etc.). After modification has been completed, a processed print job 530 exists, which includes a processed JDF job ticket 532, as well as processed PDF print data 534.

The manner in which this content is modified is tailored to the expectations of the printer that the preprocessing control file 510 is intended for. Thus, two different control files may be utilized to perform different modifications which, when interpreted by different printers, result in a similar printed output.

EXAMPLES

In the following examples, additional processes, systems, and methods are described in the context of a print shop that modifies PDF and/or JDF content for printers on an individualized basis, in a just-in-time manner.

In this example, a print shop has both a continuous forms printer and a cut sheet printer. Large jobs, such as those involving thousands of copies, are printed on the continuous-forms printer. However, the cut sheet printer is used to generate reprints of damaged pages from large jobs that were printed on the continuous-forms printer. In this example, prior to performing a reprint, a chain for the cut sheet printer is utilized to reformat the contents of the print job to a different page size and orientation than were used for the continuous-forms printer. This is because the continuous-forms printer originally printed onto a web having a different size than the final printed cut-sheet output.

The operator prepares a reprint job that includes the damaged pages scheduled for reprinting. Next, the operator generates a workflow for printing the reprint job at the cut-sheet printer. This is performed by selecting a print step within the workflow for the original print job, and replacing a printer object for the continuous-forms printer with a printer object for the cut-sheet printer. The reprint job is then added to a queue for the cut-sheet printer. The operator of the print shop advantageously does not have to change any properties of the print job when they submit the job to the cut-sheet printer, because the chain for the cut sheet printer performs all required adjustments automatically.

Eventually, the cut-sheet printer reports completion of a prior print job, indicating that the cut-sheet printer is ready to immediately print the reprint job. A chain for the cut-sheet printer modifies the content of the reprint job to adjust media type to a cut sheet size that corresponds with the final cut output from the continuous-forms printer.

Figure 6:
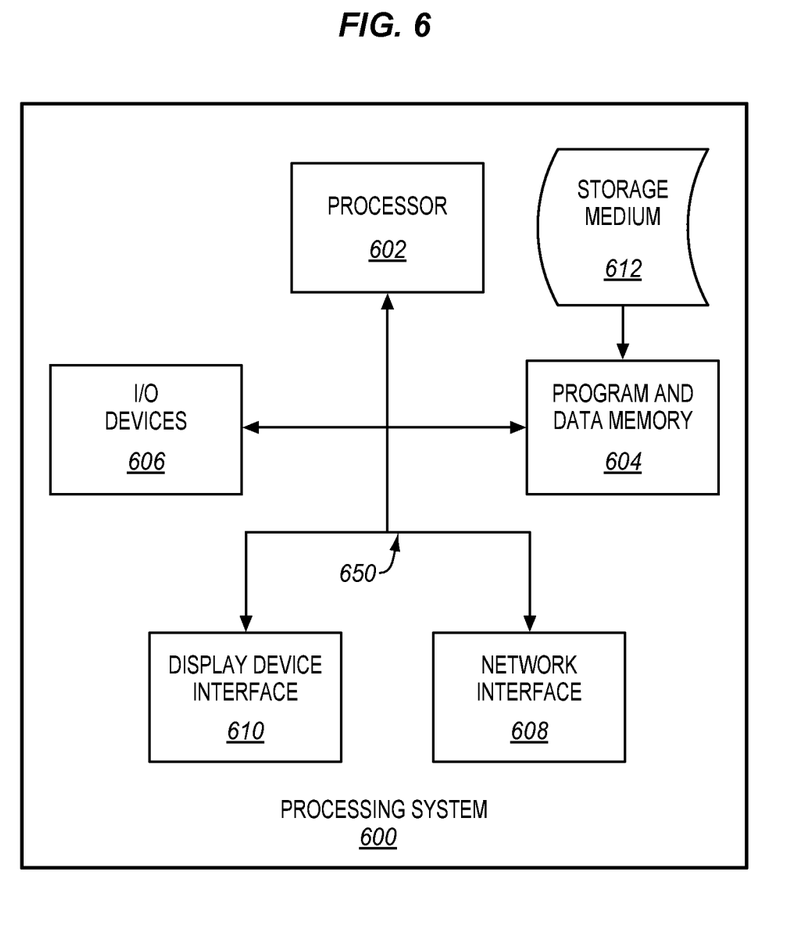
FIG. 6 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print server 130 to perform the various operations disclosed herein. FIG. 6 illustrates a processing system 600 operable to execute a computer readable medium embodying programmed instructions to perform desired functions in an illustrative embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

What is claimed is:

1. A system comprising:
a print server that serves a print shop having printers that exhibit different capabilities which cause the printers to interpret print job content differently from each other, the print server comprising:
an interface that receives print jobs that each include content in the form of a Job Definition Format (JDF) job ticket and Portable Document Format (PDF) print data;
a memory that stores the print jobs; and
a controller that schedules the print jobs for printing at the printers, and converts content in a format for at least one of the print jobs to a different implementation of the format currently used for the content, such that print jobs scheduled for printing at different printers include different implementations of the format for the content, based on the capabilities of the printer that they are scheduled for printing at, wherein different implementations of the format reflect customizations of the format,
wherein the controller converts the content via operation of a processing chain that modifies both the JDF job ticket and the PDF print data.

2. The system of claim 1 wherein:
for each print job, the controller converts content in response to determining that a printer scheduled for printing that print job is ready to immediately print that print job.

3. The system of claim 1 wherein:
for each of the printers, the memory stores a chain indicating a unique combination of modifications to perform for print jobs prior to printing, based on the capabilities of that printer.

4. The system of claim 3 wherein:
the unique combination of modifications varies between printers having different capabilities.

5. The system of claim 1 wherein:
different implementations of content comprise differences selected from the group consisting of: formatting, syntax, commands, and language.

6. The system of claim 1 wherein:
the controller converts content of the print jobs by performing operations selected from the group consisting of: removing pages, adding pages, rotating pages, replacing content, stamping pages, watermarking pages, altering finishing instructions, selecting a page size, and selecting print media.

7. The system of claim 1 wherein:
the different capabilities comprise differences in interpretation of JDF instructions, and the controller converts content by altering the JDF instructions to a different implementation of JDF.

8. The system of claim 1 wherein:
the different capabilities comprise differences in interpretation of PDF instructions, and the controller converts content by altering the PDF instructions to a different implementation of PDF.

9. A method comprising:
receiving print jobs that each include content in the form of a Job Definition Format (JDF) job ticket and Portable Document Format (PDF) print data;
scheduling the print jobs for printing at printers that exhibit different capabilities which cause the printers to interpret print job content differently from each other; and
converting content in a format for at least one of the print jobs to a different implementation of the format currently used for the content, such that print jobs scheduled for printing at different printers include different implementations of the format for the content, based on the capabilities of the printer that they are scheduled for printing at, wherein different implementations of the format reflect customizations of the format,
wherein the converting is performed via operation of a processing chain that modifies both the JDF job ticket and the PDF print data.

10. The method of claim 9 wherein:
converting content of the print jobs is performed, for each print job, in response to determining that a printer scheduled for printing that print job is ready to immediately print that print job.

11. The method of claim 9 further comprising:
for each of the printers, storing a chain indicating a unique combination of modifications to perform for print jobs prior to printing, based on the capabilities of that printer.

12. The method of claim 11 wherein:
the unique combination of modifications varies between printers having different capabilities.

13. The method of claim 9 wherein:
different implementations of content comprise differences selected from the group consisting of: formatting, syntax, commands, and language.

14. The method of claim 9 wherein:
converting content of the print jobs comprises performing operations selected from the group consisting of: removing pages, adding pages, rotating pages, replacing content, stamping pages, watermarking pages, altering finishing instructions, selecting a page size, and selecting print media.

15. The method of claim 9 wherein:
the different capabilities comprise differences in interpretation of JDF instructions, and the method further comprises converting content by altering the JDF instructions to a different implementation of JDF.

16. The method of claim 9 wherein:
the different capabilities comprise differences in interpretation of PDF instructions, and the method further comprises converting content by altering the PDF instructions to a different implementation of PDF.

17. A non-transitory computer readable medium embodying programmed instructions which, when executed by a processor, are operable for performing a method comprising:
receiving print jobs that each include content in the form of a Job Definition Format (JDF) job ticket and Portable Document Format (PDF) print data;
scheduling the print jobs for printing at printers that exhibit different capabilities which cause the printers to interpret print job content differently from each other; and
converting content in a format for at least one of the print jobs to a different implementation of the format currently used for the content, such that print jobs scheduled for printing at different printers include different implementations of the format for the content, based on the capabilities of the printer that they are scheduled for printing at, wherein different implementations of the format reflect customizations of the format,
wherein the converting is performed via operation of a processing chain that modifies both the JDF job ticket and the PDF print data.

18. The non-transitory computer readable medium of claim 17 embodying programmed instructions which, when executed by a processor, are operable for performing a method wherein:
converting content of the print jobs is performed, for each print job, in response to determining that a printer scheduled for printing that print job is ready to immediately print that print job.

19. The non-transitory computer readable medium of claim 17 embodying programmed instructions which, when executed by a processor, are operable for performing a method further comprising:
for each of the printers, storing a chain indicating a unique combination of modifications to perform for print jobs prior to printing, based on the capabilities of that printer.

20. The non-transitory computer readable medium of claim 19 embodying programmed instructions which, when executed by a processor, are operable for performing a method wherein:
the unique combination of modifications varies between printers having different capabilities.

* * * * *